Patented Nov. 26, 1935

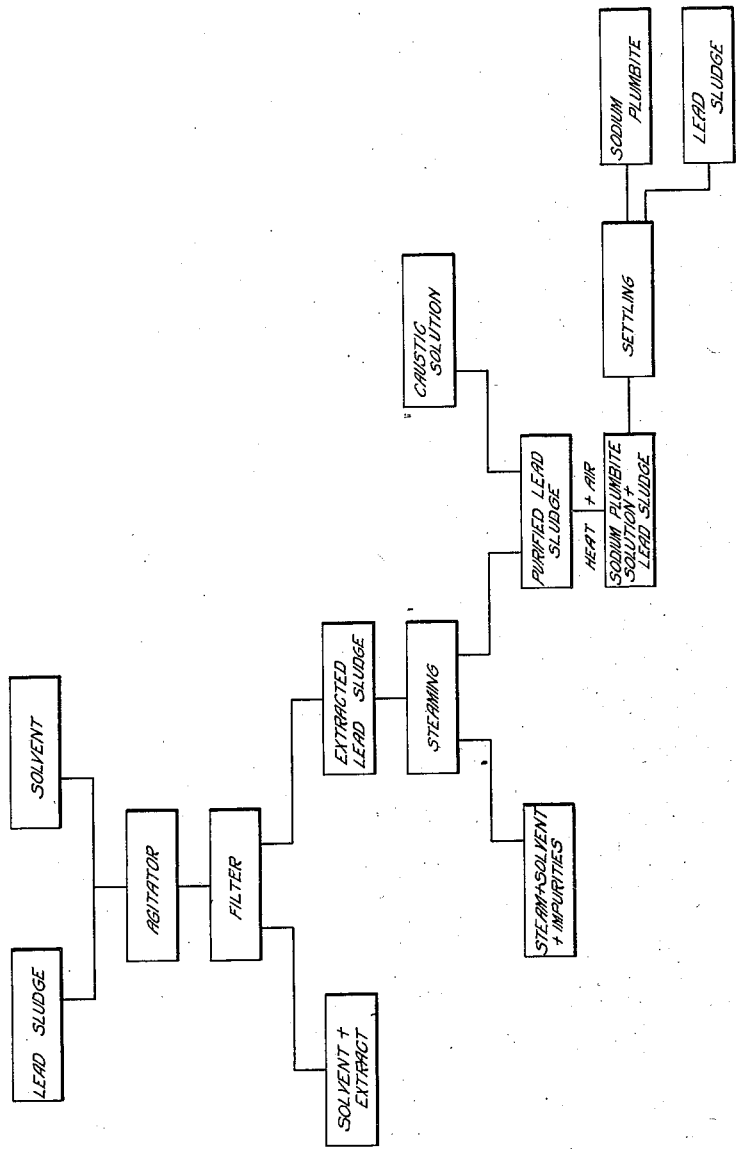

2,022,558

UNITED STATES PATENT OFFICE 2,022,558

PREPARATION OF DOCTOR SOLUTIONS

Byron F. Dooley, Jr., Port Arthur, Tex., assignor to The Texas Company, New York, N. Y., a corporation of Delaware Application July 6, 1933, Serial No. 679,164

6 Claims. (Cl. 23—51)

This invention relates to a method of preparing alkali metal plumbite solutions adapted for use in the sweetening of sour hydrocarbon oils, and more particularly has reference to the preparation of such solutions from by-product precipitated lead sulfide, resulting from previous sweetening operations with plumbite solutions.

Alkaline solutions of lead compounds have been used for many years by refiners for transforming the undesirable mercaptan compounds present in light hydrocarbon oils into the corresponding innocuous organic disulfide compounds. This reaction may be represented by the following equations:

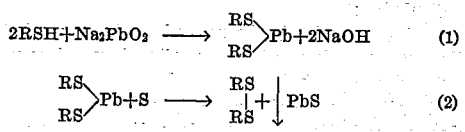

(1)

(2)

The sodium plumbite solutions, or doctor solutions as they are spoken of in refinery terminology, used in bringing about this reaction have been prepared for the most part by reacting litharge with caustic solutions whereby the desired plumbite is formed. This reaction may be represented as follows:

$$2NaOH + PbO \rightarrow Na_2PbO_2 + H_2O \quad (3)$$

Within more recent years it has been found that precipitated lead sulfide may be used as a substitute for the litharge, in which case the lead sulfide is reacted with a caustic solution at an elevated temperature and in the presence of air. As a result of this reaction, the lead sulfide is converted almost quantitatively into the desired sodium plumbite.

In carrying out this reaction, by-product lead sulfide which is spoken of as lead sludge and which is produced as one of the products of the sweetening operation (Vide Equation 2) may successfully be used for preparing sodium plumbite. However, when lead sludge, obtained as a by-product in the treatment of certain naphthas, especially those containing high percentages of unsaturated compounds, is reacted with caustic soda at elevated temperatures in the presence of air, the resultant sodium plumbite solution, when used for treating naphthas, is found to impart to the naphthas color and gum instability.

This defect of treating solutions prepared from by-product lead sulfide has, up to the present, militated against the use of such solutions for general use in refining practice for the reason that naphthas sweetened therewith required after-treatments in order to make them stable as to color and gum content. The method most generally adopted for finishing such naphthas usually has involved steam distillation followed by treatment with alkaline plumbite solutions prepared from litharge.

I have found that the reason for the instability of naphthas treated with plumbite solutions prepared from by-product lead sulfide is due to the fact that the lead sulfide, which is extremely porous and flocculent, contains adsorbed organic compounds of great instability. When the lead sulfide is subsequently reacted with caustic to form a plumbite solution, these unstable organic compounds become suspended or dissolved in the plumbite solution. Finally, when the sour naphtha, that is, one containing mercaptan compounds, is treated with such a plumbite solution, small quantities of this material become dissolved in the naphtha undergoing treatment with the result that the naphtha is seeded with some of the unstable organic compounds.

There is reason to believe that the unstable organic compounds, which are adsorbed on the by-product lead sulfide, are extremely active oxidation catalysts and, when they eventually find their way into naphthas containing unsaturated compounds, a very rapid oxidation of the unsaturated hydrocarbons results. This appears to account for the fact that only minute quantities of the unstable organic compounds are necessary to render unstable large quantities of otherwise color and gum stable naphthas.

I have discovered that the adsorbed unstable organic compounds may successfully be removed from the particles of the by-product lead sulfide and that plumbite solutions prepared from the lead sulfide purified in this manner do not impart any undesirable qualities to a naphtha treated with such a solution. The purification of the lead sludge may be effected in any one of several different ways. In certain cases the lead sulfide need merely be washed with hot water. Usually, however, it is more desirable to extract with a solvent displaying a high solvent action on the undesirable, unsaturated compounds. Another method of bringing about the purification of the lead sludge involves subjecting it to a treatment with steam which may be superheated, whereby the undesirable compounds are substantially distilled away from the lead sludge. From a practical standpoint, a very effective method of purification results from the combination of the extracting and the steaming processes. For example, the lead sulfide may be extracted with a solvent displaying a high solvent action on the undesirable, unsaturated compounds, after which the solvent is removed and the lead sludge then subjected to a treatment with steam whereby any remaining solvent or undesirable organic compounds are substantially distilled away from the lead sludge.

Numerous solvents including, among others, light petroleum distillates, benzol, ketones, alcohols, and certain of the chlorinated hydrocarbons show a decided solvent action on the unsaturated organic compounds adsorbed on the particles of by-product lead sulfide. In the case of certain of the solvents, much more efficient extraction may be effected by carrying out the operation at elevated temperatures and under superatmospheric pressures. It is also true that in some cases much more rapid extraction of the unsaturated compounds may be brought about by using mixtures of two or more solvents, or else aqueous solutions of water-soluble organic solvents.

My invention will be fully understood from the following description taken in connection with the flow diagram which outlines the various steps of the process.

Impure lead sludge, obtained as a precipitate in the sweetening of sour hydrocarbon oils and which is preferably in a dry condition, is introduced into a suitable agitating device where it is thoroughly mixed with an extracting solvent. As a practical consideration, the physical characteristics, as well as the quantities of the adsorbed impurities, will dictate to a large extent the type of solvent which is satisfactory for the particular purpose. Generally, however, light petroleum hydrocarbon oils such as naphtha or kerosene will be entirely satisfactory as extractants. The quantity of solvent necessary will vary from an amount sufficient to form a fluid slurry with the lead sludge to many times the volume of the lead sludge to be extracted. The type of solvent as well as the proper proportions are best determined in each instance by a simple trial experiment.

After the lead sludge has been agitated with the extracting solvent for a sufficient length of time during which the mixture may have been heated to an elevated temperature to expedite the solution of the impurities, the mixture is subjected to filtration. In this way, the extracted lead sludge is substantially separated from the solvent solution of the extracted impurities. The lead sludge discharged from the filtration operation contains a considerable amount of adsorbed solvent as well as small quantities of unextracted impurities, which materials must be removed before the lead sludge can be employed in the preparation of a doctor solution. This is most effectively accomplished by treating the lead sludge with steam which may be either saturated or superheated. The use of the proper conditions of temperature and pressure in carrying out this steaming operation is dependent in large part upon the quantities of the materials adsorbed on, and the tenacity with which they are held by, the particles of the lead sulfide.

When the lead sludge has been freed from substantially all of the solvent and the undesirable adsorbed impurities, it is conveyed into a reaction vessel where it is mixed with a calculated quantity of a caustic soda solution. The mixture is then subjected to treatment with air or other oxygen-containing gas at an elevated temperature which is preferably above 150° F. and which may be as high as 300° F. or higher. In using the more elevated temperatures, it will be found of advantage to carry out the reaction under elevated pressures which may be as high as 200 lbs. per square inch or higher. The choice of the proper conditions in effecting the solution of the lead sludge in the caustic soda solution depends largely upon the characteristics of the lead sludge employed. In some cases the lead sludge is found to be extremely flocculent and finely divided and in other cases the particles of lead sludge are much coarser and more compact. It will be found that the former type of lead sludge is much more reactive and that much less rigorous reaction conditions are required for bringing about its solution in caustic soda solutions.

By using an excess of the purified lead sludge in the reaction with caustic soda, much more rapid reaction rates can be achieved. When the reaction has gone to completion, it will therefore be necessary to settle out or separate from the sodium plumbite solution the remaining unreacted lead sludge. The separated doctor solution prepared in this manner compares favorably with a doctor solution prepared from litharge in that it does not impart any color or gum instability to the naphthas.

Obviously many modifications and variations of the invention, as hereinbefore set forth, may be made without departing from the spirit and scope thereof, and therefore only such limitations should be imposed as are indicated in the appended claims.

I claim:

1. The method of preparing doctor solution for the sweetening of sour oils from impure lead sludge present in spent doctor solution, which comprises separating the lead sludge from spent doctor solution, extracting it with an organic solvent adapted to remove organic impurities therefrom, removing the solvent, and then dissolving the purified lead sludge in a caustic solution maintained at elevated temperature while blowing with air, whereby a doctor solution is secured which is substantially free from substances tending to impart color and gum instability to naphthas treated therewith.

2. The method of preparing doctor solution for the sweetening of sour oils from impure lead sludge precipitated in the sweetening of oils, which comprises subjecting the lead sludge to extraction with a solvent adapted to remove the objectionable impurities, separating the extracted lead sludge from the solvent, subjecting it to the action of steam to remove any remaining solvent and impurities, and then dissolving the sludge in a caustic solution by blowing with air while maintained at an elevated temperature.

3. The method of preparing doctor solution for the sweetening of sour oils from impure lead sludge precipitated in the sweetening of oils, which comprises subjecting the lead sludge to extraction with a light petroleum hydrocarbon oil at an elevated temperature and under superatmospheric pressure, separating the extracted lead sludge from the solvent, treating it with steam to further purify it, and then dissolving the sludge in a caustic solution by blowing with air while maintained at an elevated temperature.

4. The method of preparing doctor solution for the sweetening of sour oils from impure lead sludge precipitated in the sweetening of oils, which comprises subjecting the lead sludge to extraction with benzol at an elevated temperature and under superatmospheric pressure, separating the extracted lead sludge from the solvent, treating it with steam to further purify it, and then dissolving the sludge in a caustic solution by blowing with air while maintained at an elevated temperature.

5. The method of preparing doctor solution for the sweetening of sour oils from impure lead sludge present in spent doctor solution, which comprises separating the lead sludge from spent doctor solution, extracting it with a light hydrocarbon oil adapted to remove organic impurities therefrom, removing the hydrocarbon oil, and then dissolving the purified lead sludge in a caustic solution maintained at elevated temperature while blowing with air, whereby a doctor solution is secured which is substantially free from substances tending to impart color and gum instability to naphthas treated therewith.

6. The method of preparing doctor solution for the sweetening of sour oils from impure lead sludge present in spent doctor solution, which comprises separating the lead sludge from spent doctor solution, drying it, extracting the dried lead sludge with a light hydrocarbon oil adapted to remove organic impurities therefrom, removing the hydrocarbon oil, and then dissolving the purified lead sludge in a caustic solution maintained at elevated temperature while blowing with air, whereby a doctor solution is secured which is substantially free from substances tending to impart color and gum instability to naphthas treated therewith.

BYRON F. DOOLEY, Jr.